United States Patent [19]

Becker et al.

[11] Patent Number: 4,826,606

[45] Date of Patent: May 2, 1989

[54] MANUFACTURE AND USE OF POLYMER MODIFIED ALUMINUM HYDROXIDE AND BASIC ALUMINUM SULFATE

[75] Inventors: Larry W. Becker, Marcellus, N.Y.; John B. Lukas, Succasunna, N.J.

[73] Assignee: General Chemical Corporation, Syracuse, N.Y.

[21] Appl. No.: 47,425

[22] Filed: May 6, 1987

[51] Int. Cl.$^4$ .................................................. C02F 1/56
[52] U.S. Cl. ..................................... 210/728; 210/725; 252/175; 252/181; 423/467; 423/468; 423/629; 423/462
[58] Field of Search ................. 252/175, 181; 210/723, 210/728; 423/467, 468, 629, 462

[56] References Cited

U.S. PATENT DOCUMENTS

| | | | |
|---|---|---|---|
| 3,323,979 | 6/1967 | Foster et al. | 162/167 |
| 3,440,008 | 4/1969 | Bonelli | 423/551 |
| 3,544,476 | 12/1970 | Aiba et al. | 252/175 |
| 3,738,945 | 6/1973 | Panzer et al. | 528/405 |
| 3,790,529 | 2/1974 | Fujimura et al. | 525/157 |
| 3,859,212 | 1/1975 | Smalley et al. | 210/734 |
| 3,894,144 | 7/1975 | Becher et al. | 423/462 |
| 3,907,758 | 9/1975 | Sackmann et al. | 162/168 |
| 3,929,666 | 12/1975 | Aiba et al. | 252/175 |
| 3,988,277 | 10/1976 | Witschonke et al. | 524/195 |
| 4,051,028 | 9/1977 | Flessinger | 252/175 |
| 4,069,299 | 1/1978 | Hodgson | 423/462 |
| 4,238,347 | 12/1980 | Gancy et al. | 252/175 |
| 4,251,410 | 2/1981 | Danner et al. | 260/29.40 A |
| 4,284,611 | 8/1981 | Gancy et al. | 423/308 |
| 4,385,903 | 5/1983 | Moriyama et al. | 210/732 |
| 4,566,986 | 1/1986 | Waldmann | 252/175 |
| 4,582,627 | 4/1986 | Carlsson | 252/175 |
| 4,617,362 | 10/1986 | Becker et al. | 526/209 |
| 4,655,934 | 4/1987 | Rose et al. | 210/728 |

FOREIGN PATENT DOCUMENTS

| | | |
|---|---|---|
| 0005419 | 11/1979 | European Pat. Off. . |
| 0017634 | 10/1980 | European Pat. Off. . |
| 59-016599 | 1/1984 | Japan .................................. 210/728 |
| 61-54300 | 3/1986 | Japan . |
| 596545 | 3/1978 | U.S.S.R. ............................. 423/629 |
| 1548620 | 7/1979 | United Kingdom . |

OTHER PUBLICATIONS

Encyclopedia of Polymer Science and Technology, vol. 7, 1967, "Flocculation".
"Selecting Coagulant, Filtration, and Sludge-Conditioning Aids" Steven K. Kentel, John J. Resta, Prasanna V. Shetty, and Todd A. Bober, Research and Technology, vol. 72, Journal AWWA, pp. 72–84, Jan. 1988.
"Coagulation and Flocculation" by John Bratby, Chapter 3, Uplands Press Ltd., 1980.

Primary Examiner—Robert A. Wax
Attorney, Agent, or Firm—Brumbaugh, Graves, Donohue & Raymond

[57] ABSTRACT

Utilization of a cationic polymer as a settling aid in the recovery of the aluminum hydroxide and an anionic polymer to dewater the aluminum hydroxide prior to redissolution not only improves the process of making basic aluminum compounds by speeding settling and improving filterability, but also unexpectedly yields a product that has superior effectiveness as a water treatment chemical.

According to the invention, a dilute solution of alum is neutralized with a base to a pH below about 6.0, preferably below 5.5, to form a suspension of aluminum hydroxide. A cationic polymer is then added to the suspension to assist in the settling of the aluminum hydroxide. When settling is substantially complete, the solution is decanted from the aluminum hydroxide and an anionic polymer is added to dewater the aluminum hydroxide. The dewatered material is collected as a filter cake containing amorphous aluminum hydroxide, the cationic polymer and the anionic polymer.

The filter cake formed in this manner can be combined with aluminum sulfate or other aluminum species to form basic aluminum complexes. Surprisingly, however, the basic aluminum compounds formed from the filter cake are more effective in the reduction of water turbidity than comparable basic aluminum compounds formed without the use of the cationic and anionic polymers.

31 Claims, 2 Drawing Sheets

MANUFACTURE AND USE OF POLYMER MODIFIED ALUMINUM HYDROXIDE AND BASIC ALUMINUM SULFATE

BACKGROUND OF THE INVENTION

This invention relates to aluminum compositions useful in water treatment and to methods for the manufacture and use thereof.

Aluminum sulfate (alum), aluminum chloride, and basic aluminum species derived therefrom are known to be useful in the treatment of both potable and waste water. For example, the use of alum as a water treatment chemical is described generally in U.S. Pat. No. 3,959,133. Basic aluminum sulfate (BAS), basic aluminum chloride (BAC) and basic aluminum chloride sulfate (BACS) are discussed in U.S. Pat. Nos. 1,137,005, 3,440,008, 3,544,476, 3,929,666, 4,051,028, 4,069,299, 4,238,347, 4,284,611, British Pat. No. 442,144 and European Patent Appln. Nos. 0 005 419 and 0 017 634.

One known method for making basic aluminum compounds from alum involves precipitation of aluminum hydroxide from a dilute alum solution (approx. 1.2% $Al_2O_3$) by addition of a base. The aluminum hydroxide precipitate is then separated from the remaining solution and is redissolved in a solution of either aluminum sulfate to form BAS or aluminum chloride to form BACS. In this method, however, the precipitation step can be lengthy, and the aluminum hydroxide recovered is difficult to filter and still contains a substantial amount of water, thus reducing the concentration of the final product achievable.

SUMMARY OF THE INVENTION

It has now been found that utilization of a cationic polymer as a settling aid in the recovery of the aluminum hydroxide and an anionic polymer to dewater the aluminum hydroxide prior to redissolution not only improves the process of making basic aluminum compounds by speeding settling and improving filterability, but also unexpectedly yields a product that has superior effectiveness as a water treatment chemical.

According to the invention, a dilute solution of alum is neutralized with a base to a pH below about 6.0, preferably below 5.5, to form a suspension of aluminum hydroxide. A cationic polymer is then added to the suspension to assist in the settling of the aluminum hydroxide. When settling is substantially complete, the solution is decanted from the aluminum hydroxide and an anionic polymer is added to dewater the aluminum hydroxide. The dewatered material is collected as a filter cake containing amorphous aluminum hydroxide, the cationic polymer and the anionic polymer.

The filter cake formed in this manner can be combined with aluminum sulfate or other aluminum species to form basic aluminum complexes. Surprisingly, however, the basic aluminum compounds formed from the filter cake are more effective in the reduction of water turbidity than comparable basic aluminum compounds formed without the use of the cationic and anionic polymers.

DETAILED DESCRIPTION OF THE INVENTION

Figure 1:
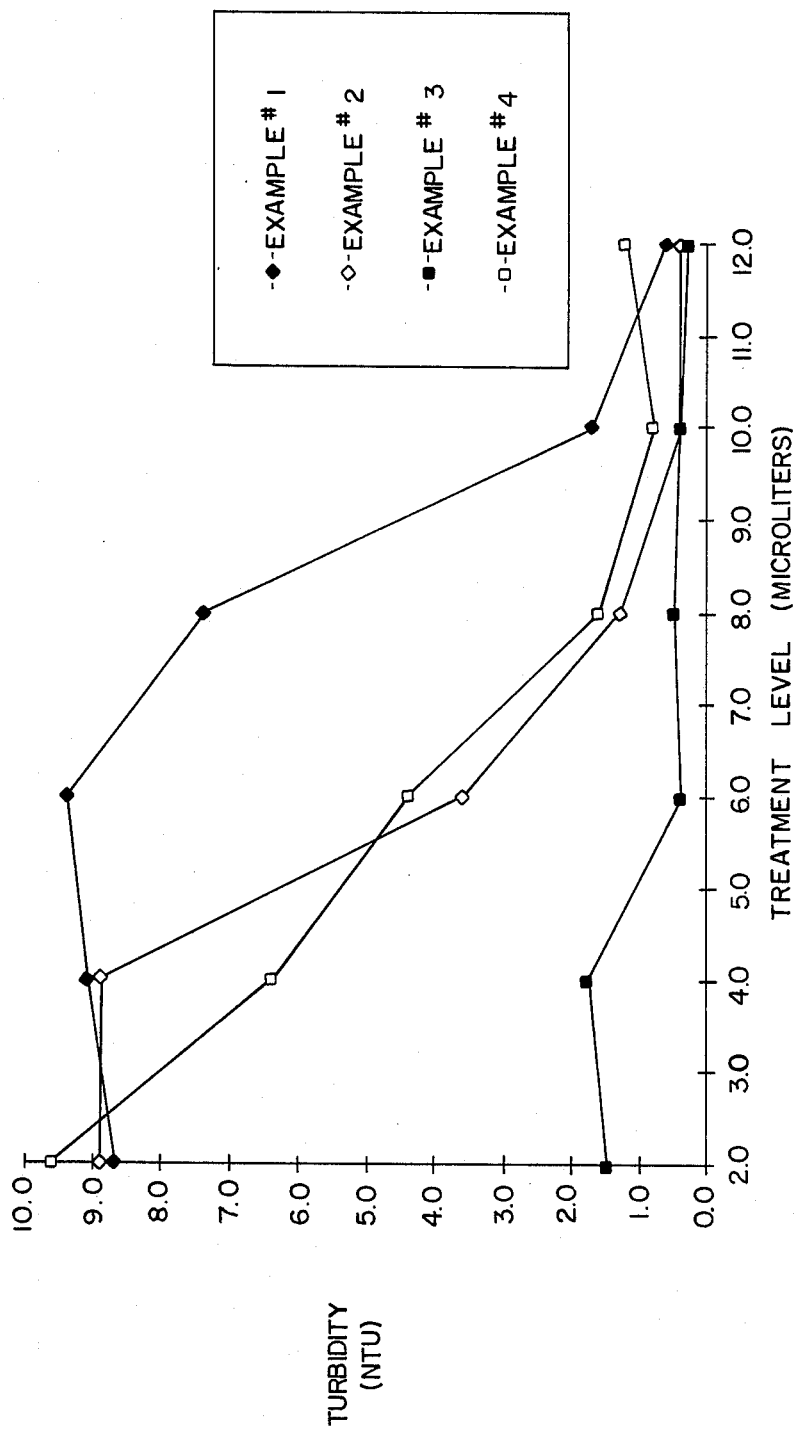
FIG. 1 shows a graphical comparison of the effectiveness of the compositions according to the invention with other compositions in the reduction of water turbidity.

According to the invention, an aluminum hydroxide filter cake is formed by first neutralizing a dilute alum solution (about 1.2% $Al_2O_3$) with a base, such as sodium hydroxide or sodium carbonate. When the base is sodium carbonate, the products formed are aluminum hydroxide, sodium sulfate and carbon dioxide according to the equation

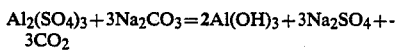

$$Al_2(SO_4)_3 + 3Na_2CO_3 = 2Al(OH)_3 + 3Na_2SO_4 + 3CO_2$$

To the resulting suspension of solid aluminum hydroxide a settling aid is added in the form of a cationic polymer. The cationic polymer is added in an amount effective to aid in the settling of the aluminum hydroxide. For example, the cationic polymer can advantageously be added in concentrations of about 50 ppm, or higher. Preferably, the cationic polymer is utilized in a range from 100 ppm to 5000 ppm which leads to a weight ratio of aluminum (as $Al_2O_3$) to cationic polymer of about 40:1 to 800:1 in the final product.

Suitable cationic polymers for use in the invention are homopolymers or copolymers that will enhance the settling of the aluminum hydroxide precipitate. Preferably, the cationic polymer used will have a molecular weight of at least about 2 million, and from about 5 mole % to 100 mole % cationic monomers. Higher molecular weights are most preferred, as these have the greatest utility as settling aids, but it will be recognized that in known cationic polymers, increases in the percent of cationic monomers limit the molecular weight that is achievable such that a tradeoff between charge and molecular weight may be required. Moreover, if very high charge densities are achieved, lower molecular weight polymers such as CPS Chemicals AgeFloc® A-50, a dimethylamine epichlorohydrin copolymer may be used.

Particularly preferred polymers for use as the cationic settling aid in accordance with the invention are those in which the cationic monomers are salts of acrylates or methacrylates, such as (meth)acryloyloxyethyltrimethylammonium chloride. Also important are polymers derived from methacrylamidopropyltrimethylammonium chloride (MAPTAC) and diallyldimethylammonium chloride (DADMAC) monomers. These monomers can be used in homopolymers or as copolymers with (meth)acrylamide monomers. By copolymer, is meant polymers having a plurality of different monomer types. For example suitable copolymers are described in U.S. Pat. No. 4,617,362, which is incorporated herein by reference.

It may also be advantageous to add polyvinyl alcohol before or during the precipitation. The basis for this is described in a separately filed, commonly assigned application.

Following addition of the cationic polymer, the aluminum hydroxide settles more rapidly than it would had the cationic polymer not been added. When the settling is substantially complete, essentially all of the solid aluminum hydroxide is in the form of a gel at the bottom of the settling vessel, and separated from a solution containing the sulfate salt. At this point, the sulfate-containing solution is decanted and the aluminum hydroxide gel recovered. If a low sulfate product is desired, one or more washing steps may be interposed at this point, in which case fresh water is added to the gel and, following agitation, the suspension is once again allowed to settle and is decanted.

The aluminum hydroxide gel is not readily handled because it contains a large amount of water and is, moreover, difficult to filter. According to the invention, therefore, an anionic polymer is added in an amount effective to act as a dewatering agent. In particular, the anionic polymer may advantageously be added in an amount from 100 ppm to 1000 ppm which leads to a weight ratio of aluminum (as $Al_2O_3$) to anionic polymer of about 80:1 to 800:1 in the final product. Following addition of the anionic polymer with stirring to the aluminum hydroxide gel, the dewatered gel is readily filterable to form an aluminum hydroxide filter cake.

The anionic polymers useful in the invention are generally those polymers that are effective in dewatering an aluminum hydroxide gel. In particular, acrylate or methacrylate based polymers such as sodium (meth)acrylate/acrylamide copolymer or acrylamido-2-methyl-2-propane sulfonic acid/acrylamide copolymer are useful as the anionic polymer in the invention. The anionic polymer preferably has a molecular weight of from about 10 million to 50 million and contains 5 mole % to 50 mole % anionic monomers. Most preferably, the anionic polymer contains about 30 mole % charged monomers.

The aluminum hydroxide filter cake thus produced contains not only aluminum hydroxide, but also some of both the cationic and the anionic polymer, some of the sulfate salt, and water. It has been found that the composition of the filter cake is from about 15% to about 20% aluminum hydroxide having a basicity of about 85% to 90%. In the filter cake, the weight ratio of aluminum hydroxide to cationic polymer is preferably about 150:1 to 250:1, and the weight ratio of aluminum hydroxide to anionic polymer is preferably about 250:1 to 350:1.

Basic aluminum compounds can be formed from the filter cake by addition of other aluminum species. For example, the filter cake can be dissolved in a solution of alum to form basic aluminum sulfate. The degree of basicity in the resulting BAS can be controlled by the relative amounts of aluminum hydroxide to alum used. For many water treatment applications, the preferred basicity is 50%, which can be achieved be combining aluminum hydroxide and alum in a ratio of about 1 to 1, depending on the basicity of the filter cake. Other basic aluminum complexes can be formed in a similar manner by dissolving the filter cake in solutions of different aluminum salts. Thus BACS can be formed by dissolving the filter cake in a solution of aluminum chloride.

Solutions of basic aluminum complexes that are prepared in accordance with the invention and thus contain both the cationic and anionic polymers have been found to be surprisingly more effective than comparable basic aluminum complexes that do not have both polymers present. Furthermore, as shown in FIG. 1, this effect depends on the presence of both polymeric species, and is not the additive result of the two polymeric species taken separately. Thus, there is an interaction between the basic aluminum complex and both of the polymers which leads to the enhanced performance of the basic aluminum complexes of the invention. It has been found that the solutions according to the invention may, however, exhibit some instability during storage for periods in excess of about two months. In addition, the aluminum hydroxide precipitate, like amorphous aluminum hydroxide generally becomes decreasingly soluble over time. It is therefore preferred that the aluminum hydroxide be used within a period of 7 to 10 days following preparation.

EXAMPLE 1

Bench Testing of Polymer Modified BAS

Four samples of basic aluminum sulfate were prepared as follows. A solution of commercial alum (50% solids, 8.3% alumina), was diluted with 918.7 g of water and placed in a 2 liter beaker equipped with a mechanical stirrer. Sodium carbonate (42.0 g) was diluted with 108.0 g of water and slowly added to the alum solution. Additional sodium carbonate solution may be added to bring the pH to 6.0. The mechanical stirring was continued for an additional 30 minutes.

The solid was then allowed to settle without agitation for an additional 30 minutes and approximately one half of the liquid was decanted and weighed. The same weight of the water was added to the residue and the slurry was agitated for 15 minutes. After settling, half of the clear liquid was decanted and discarded.

The aluminum hydroxide was then filtered through a Büchner funnel. After pressing out as much water as possible, the aluminum sludge cake weighed 132.2 g and had an alumina content of 10.89% with a basicity of 85%. A weighed quantity of the aluminum hydroxide sludge (75 g) was then slurried in a solution of 68.9 g of alum and 29.6 g of water. After the aluminum hydroxide dissolved, the clear solution was filtered and determined to have an alumina content of 8.2% and a basicity of 55.8%.

The same procedure was followed except that 15.1 g of a 0.5% solution of Clarifloc ® C-316 (10 mole % methacryloyloxyethyltrimethylammonium chloride/acrylamide copolymer available from Allied Signal Corp.) was added to the aluminum hydroxide sludge after the initial 30 minutes of stirring. The resulting sludge cake after filtration and pressing weighed 148.8 g. The alumina content was 9.68 and the basicity was 0.85. The C-316 treated sludge (75 g) was added to a solution of 61.2 of alum and 18.1 g of water. After dissolution and filtration, the clear solution had an alumina content of 8.2% and a basicity of 55.7%.

A third sample was prepared by the same procedure except that 81.2 g of 0.5% Clarifloc ® 820 (inverse emulsion of at 30% of a 30° mole % sodium acrylate/acrylamide copolymer available from Allied Signal) was added with stirring to the aluminum hydroxide sludge before filtering. The aluminum hydroxide sludge (75 g) was mixed with 58.8 g of alum and 14.4 g of water in the usual manner to give a product containing 8.8% alumina with a basicity of 55.3%.

A fourth sample of aluminum hydroxide was prepared from alum as described in example 1. After the 30 minutes of mixing, 15.0 g of a 0.5% solution of Clarifloc ® C-316 was added. After a further 30 minutes of stirring, the sludge was allowed to settle for 30 minutes. Two decantations with replacement of water were then conducted. A 0.5% solution of Clarifloc 820 (80.5 g) was added with stirring. The sludge was then filtered and pressed dry. The resulting sludge (75 g, 9.27% alumina, 0.85 basicity) was then dissolved in 58.6 g of alum and 14.1 g of water. The final product had an alumina content of 8.72 and a basicity of 56.2%.

To evaluate the performance of these four samples the following jar tests were performed. Stock solutions of sodium bicarbonate and sodium chloride were prepared by dissolving 35 g of each reagent in 3.5 liters of distilled water to form solutions of 10,000 ppm concentration. A sodium bentonite dispersion was prepared by adding approximately 6 g to 250 g of water. Samples with a turbidity of approximately 10–12 NTU were prepared by adding 2.5 ml of the bentonite dispersion to 1 liter of standard testing water.

Standard test solutions were prepared by adding approximately 900 ml of distilled water to a 1 liter beaker that can be stirred at different speeds. 5 ml of the sodium bicarbonate and 5 ml of the sodium chloride stock solutions were added to each of the test beakers to give a final concentration of 50 ppm for sodium bicarbonate and sodium chloride in each test beaker. 2.5 ml of sodium bentonite dispersion was added to each of the test beakers containing the water, sodium bicarbonate and sodium chloride, and the contents were shaken thoroughly. Water was then added to bring the final volume to 1 liter. The solutions were then stirred and the pH was adjusted in each beaker to pH 7 with dilute acid or base.

The stirring was adjusted to 100 rpm and 2, 4, 6, 8, 10 and 12 μl aliquots of each of the four samples were added to four series of test beakers containing the sodium bentonite dispersion. After stirring for 2 minutes, the speed was adjusted to 20 rpm for 10 minutes. The stirring was then stopped and the formed floc was allowed to settle for 30 minutes. An aliquot of the settled water was removed and residual turbidity was measured using a Hach Ratio Turbidimeter.

FIG. 1 summarizes the performance test results. It is immediately apparent that the combination of the Clarifloc ® 316 and 820 performs significantly better than the material formed when either of the individual components alone or no polymer is used in preparing the product.

EXAMPLE 2

Pilot-Scale Production of Polymer Modified BAS

Figure 2:
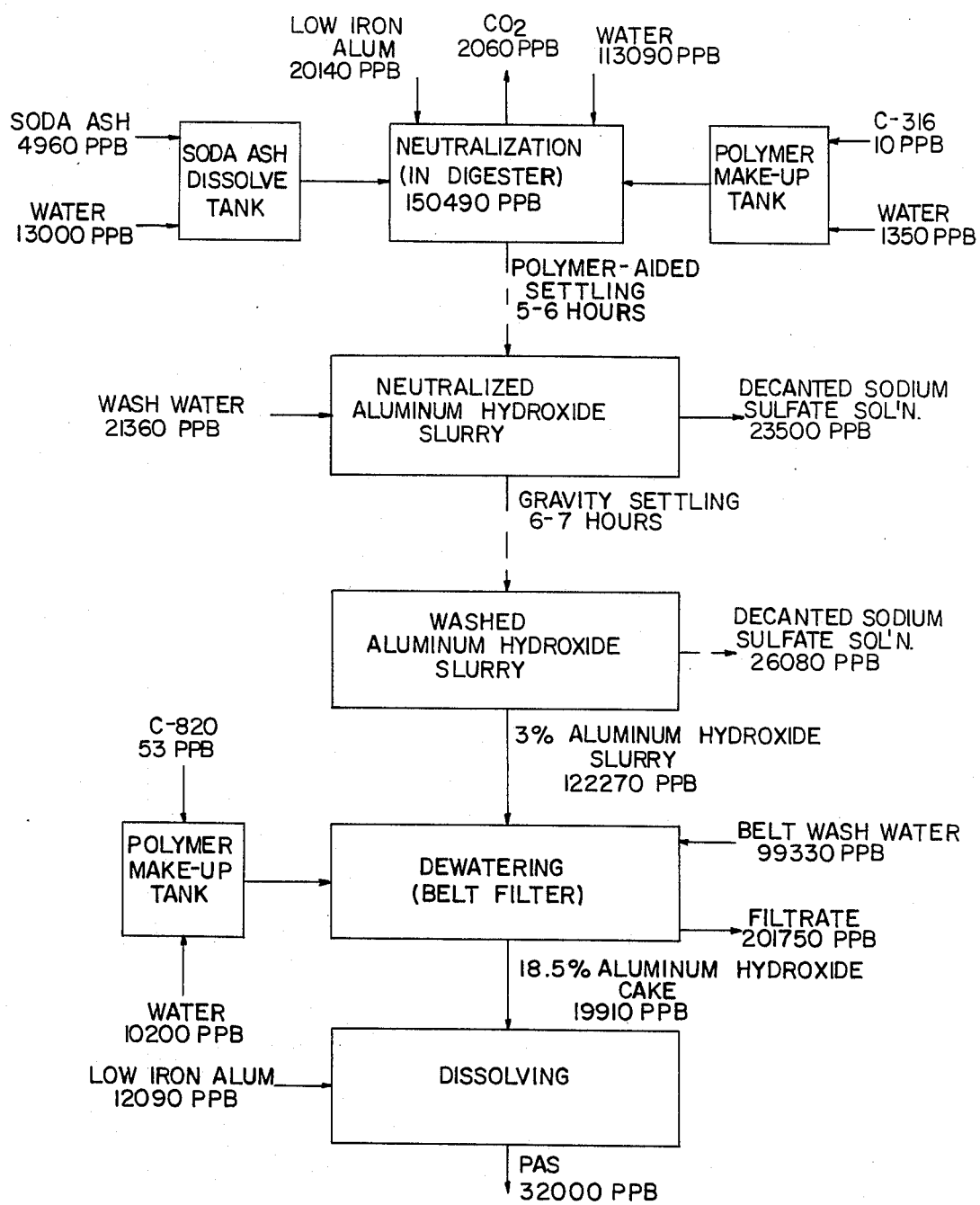
FIG. 2 is a flow chart for manufacture of BAS in accordance with the invention.

Polymer modified BAS was prepared using the general protocol laid out in FIG. 2. As shown in FIG. 2, 1820 gallons of low iron alum and water was added to a 20,300 gallon digester mix tank with a PVC recirculation line. The baume and temperature of the mixture was checked to assure an $Al_2O_3$ concentration of about 1.2%.

Soda ash and water were combined in a separate tank to produce a 28% sodium carbonate solution with agitation provided by a Lightning mixer and a recirculation pump. Each batch of sodium carbonate solution was allowed to mix for about ten minutes before being introduced into the neutralization tank. Following mixing, the solution was fed to the neutralizer using a header, a 10-foot section of PVC pipe with about 20 holes in it, suspended from the tank top. A total of 5100 lbs of soda ash in three batches of sodium carbonate solution, was required to neutralize the dilute alum solution to a pH of 5.2.

Following addition of the soda ash, the neutralized suspension was allowed to mix and react for an additional 30 minutes. Then, 8 lbs of Clarifloc ® C-316 was added in the form of an 0.5% solution. The batch was allowed to settle for about six hours, after which the clear supernatant (sodium sulfate solution) was decanted using a siphon hose system and liquor pump. Fresh water was added to restore the original volume and, following a brief agitation the suspension was again allowed to settle for six hours. The clear supernatant was again decanted.

The washed aluminum hydroxide slurry was then fed to a Komline-Sanderson belt filter for dewatering with an 0.5% solution of Allied-Signal's Clarifloc ® 820 emulsion polymer being used to condition the aluminum hydroxide. The slurry was fed to the filter at about 35 gpm, and produced a filter cake having 18% average solids.

The resulting filter cake was added as it was formed into 1000 gallons of alum having a concentration of 8.3% $Al_2O_3$ in a 4000 gallon stirred tank. After all of the filter cake had been added, the mixture was allowed to agitate for two hours. A pressure leaf filter was then used to remove undissolved solids from the BAS solution. The final BAS solution contained 8.1% $Al_2O_3$ and had a basicity of 51%.

We claim:

1. A liquid composition for use in water treatment comprising
   (a) a basic aluminum complex;
   (b) a cationic polymer selected from the group consisting of cationic polymers that are effective as settling aids in the formation of an aluminum hydroxide precipitate; and
   (c) an anionic polymer selected from the group consisting of anionic polymers that are effective as dewatering agents for amorphous aluminum hydroxide, wherein the composition has an aluminum content of greater than about 8% as $Al_2O_3$.

2. A composition according to claim 1, wherein the basic aluminum complex is basic aluminum sulfate.

3. A composition according to claim 1, wherein the cationic polymer has a molecular weight of 2 million to 5 million.

4. A composition according to claim 3, wherein the cationic polymer is a polyacrylamide.

5. A composition according to claim 4, wherein the cationic polymer contains 5 to 100% cationic groups.

6. A composition according to claim 1, wherein the weight ratio of aluminum as $Al_2O_3$ to cationic polymer is 40:1 to 800:1.

7. A composition according to claim 1, wherein the anionic polymer has a molecular weight of 10 million to 50 million.

8. A composition according to claim 7, wherein the anionic polymer is a polyacrylamide.

9. A composition according to claim 8, wherein the anionic polymer contains 5 to 50% anionic groups.

10. A composition according to claim 1, wherein the weight ratio of aluminum as $Al_2O_3$ to anionic polymer is 80:1 to 800:1.

11. A solid composition comprising:
    (a) aluminum hydroxide;
    (b) a cationic polymer selected from the group consisting of cationic polymers that are effective as settling aids in the formation of an aluminum hydroxide precipitate; and
    (c) an anionic polymer selected from the group consisting of anionic polymers that are effective as dewatering agents for amorphous aluminum hydroxide.

12. A composition according to claim 11, wherein the cationic polymer has a molecular weight of 2 million to 5 million.

13. A composition according to claim 12, wherein the cationic polymer is a polyacrylamide.

14. A composition according to claim 13, wherein the cationic polymer contains 5% to 100% cationic groups.

15. A composition according to claim 11, wherein the weight ratio of aluminum as $Al_2O_3$ to cationic polymer is 40:1 to 800:1.

16. A composition according to claim 11, wherein the anionic polymer has a molecular weight of 10 million to 50 million.

17. A composition according to claim 16, wherein the anionic polymer is a polyacrylamide.

18. A composition according to claim 17, wherein the anionic polymer contains 5% to 50% anionic groups.

19. A composition according to claim 11, wherein the weight ratio of aluminum as $Al_2O_3$ to anionic polymer is 80:1 to 800:1.

20. A method of treating water to reduce turbidity comprising treating the water by adding a liquid composition comprising:
   (a) a basic aluminum complex;
   (b) a cationic polymer selected from the group consisting of cationic polymers that are effective as settling aids in the precipitation of aluminum hydroxide; and
   (c) an anionic polymer selected from the group consisting of anionic polymers that are effective as dewatering agents for amorphous aluminum hydroxide, wherein the liquid composition is added to the water in an amount effective to decrease turbidity.

21. A method according to claim 20 wherein the basic aluminum complex is basic aluminum sulfate.

22. A method according to claim 20, wherein the cationic polymer has a molecular weight of 2 million to 5 million, and the anionic polymer has a molecular weight of 10 million to 50 million.

23. A method according to claim 22, wherein the cationic polymer and the anionic polymer are polyacrylamides.

24. A method according to claim 23, wherein the cationic polymer contains 5% to 100% cationic groups and the anionic polymer contains 5% to 50% anionic groups.

25. A method according to claim 20, wherein the liquid composition comprises 6% to 10% aluminum as $Al_2O_3$, and wherein the weight ratio of aluminum to cationic polymer is 40:1 to 800:1 and the weight ratio of aluminum to anionic polymer is 80:1 to 800:1.

26. A method of making an aluminum hydroxide filter cake for use in the production of basic aluminum complexes comprising:
   (a) adding base to a dilute solution of aluminum sulfate to form a suspension of aluminum hydroxide;
   (b) adding a cationic polymer selected from the group consisting of cationic polymers effective to aid the settling of aluminum hydroxide in the suspension;
   (c) allowing the suspension to settle to form an aluminum hydroxide gel and a separated solution;
   (d) decanting the separated solution to leave a separated aluminum hydroxide gel;
   (e) adding an anionic polymer selected from the group consisting of anionic polymers effective to dewater aluminum hydroxide to the separated aluminum hydroxide gel; and
   (f) filtering the anionic polymer-containing gel to recover an aluminum hydroxide filter cake containing both the cationic polymer and the anionic polymer.

27. A method according to claim 26, wherein the base in sodium carbonate.

28. A method according to claim 26, wherein the cationic polymer has a molecular weight of from 2 million to 5 million, and the anionic polymer has a molecular weight of from 10 million to 50 million.

29. A method according to claim 28, wherein the cationic polymer and the anionic polymer are polyacrylamides.

30. A method according to claim 29, wherein the cationic polymer contains 5% to 100% cationic groups and the anionic polymer contains 5% to 50% anionic groups.

31. A method according to claim 26, wherein the cationic and anionic polymers are added in amounts such that the weight ratio of aluminum hydroxide to cationic polymer in the filter cake is 150:1 to 250:1 and the weight ratio of aluminum hydroxide to anionic polymer in the filter cake is 250:1 to 350:1.

* * * * *